United States Patent [19]

Mountain

[11] Patent Number: 4,535,446

[45] Date of Patent: Aug. 13, 1985

[54] DIGITAL TRANSMISSION SYSTEMS

[75] Inventor: Peter J. Mountain, The Hague, Netherlands

[73] Assignee: British Telecommunications, London, England

[21] Appl. No.: 524,776

[22] Filed: Aug. 19, 1983

[30] Foreign Application Priority Data

Aug. 26, 1982 [GB] United Kingdom ............... 8224481

[51] Int. Cl.³ ............................................. H04Q 11/04
[52] U.S. Cl. .......................................... 370/68; 370/84
[58] Field of Search .................... 370/66, 68, 100, 108

[56] References Cited

U.S. PATENT DOCUMENTS

| | | | |
|---|---|---|---|
| 3,637,941 | 7/1972 | Rekiere | 370/68 |
| 3,773,978 | 10/1973 | LeRoy | 370/68 |
| 4,207,435 | 6/1980 | Okada et al. | 370/68 |
| 4,224,474 | 9/1980 | Savit | 370/68 |
| 4,312,063 | 1/1982 | Warner | 370/68 |

FOREIGN PATENT DOCUMENTS 501344 9/1970 Switzerland .

OTHER PUBLICATIONS

Electronics and Communications in Japan, vol. 49, No. 11, Nov. 1966, pp. 118–128, IEEE, Washington, US, T. Osatake et al: "4. PCM Switching System"-p. 124; FIG. 12; p. 126, FIG. 19 and right–hand column, lines 31-35. Processings of the IEEE, vol. 65, No. 9, Sep. 1977, pp. 1295-1304, New York, US, S. Tominta et al: "Some Aspects of Time-Division Data Switch Design"-p. 1303, left–hand column, paragraph: A. Transmission Interface.
Review of Electrical Communication Laboratories, vol. 28, Nos. 5-6, May-Jun. 1980, pp. 328-337, Tokyo, JP, T. Arita et al: "Digital Data Switching Network-"-p. 330, left–hand column, lines 3-6; p. 331, right–hand column.
Colloque International de Commutation Electronique, Mar. 28-Apr. 2, 1966, pp. 513-520, Edition Chiron, Paris, FR, W. Neu et al: "Commutation Temporelle: Techniques"-p. 516, lines 3-8.

Primary Examiner—Douglas W. Olms
Assistant Examiner—Kenneth I. Rokoff
Attorney, Agent, or Firm—Cushman, Darby & Cushman

[57] ABSTRACT

An aligner with a time switching capability is disclosed. The aligner has a store for storing incoming data. The store is sufficiently large that it can hold more than one frame of information. Data is written into the store under the control of clock signals associated with the incoming data. Data is read from the store under the control of a local clock. Read addresses are generated by a unit which is so arranged that if a clash between the current write address and the generated read address is sensed to be imminent, reading of the corresponding address in the previous or subsequent frame occurs. Thus, the aligner can operate as a time switch and clashes between reading and writing are avoided by allowing slippage of one frame.

12 Claims, 5 Drawing Figures

DIGITAL TRANSMISSION SYSTEMS

DESCRIPTION

This invention relates generally to digital transmission systems and in particular relates to an aligner with a time switching capability which can be used in a digital transmission system.

It has been proposed to operate digital switching systems, e.g. digital telephone systems, in what is known as a mesochronous manner. The switches which make up such a system derive their own timing reference and communicate with other switches within the system in a mesochronous manner. This contrasts with the traditional digital switching systems for telephony which have recovered timing information from signals generated within a synchronised network and have generated a secure clock and frame to which all incoming data is aligned prior to switching.

In a mesochronous system it is necessary to provide some form of alignment device at each switching stage to align incoming signals to the local clock. The use of an aligner introduces additional delays at each switching stage. In order to combat this problem we have developed an alignment device which also has a time switching capability.

According to the present invention there is provided an aligner with a time switching capability for use in a digital transmission system, said aligner comprising storage means for storing n bytes of data in frames comprising m bytes where n>m, the storage means being arranged such that data is written sequentially under the control of timing signals associated with incoming data, and means for controlling the reading of data from said storage means, including logic means which generates read addresses for the bytes to be read, said logic means being arranged when a generated read address is in a predetermined relationship with the present write address to cause reading from the corresponding address of the previous or subsequent frame.

This arrangement allows the aligner to operate also as a time switch and clashes between reading and writing are avoided by allowing slippage of one frame.

When m is 32 bytes a preferred value of n is 43.

The logic means may comprise an arithmetic logic unit which receives the write address for each byte written into the storage means, the logic unit operating under the control of a processor and local clock to generate said read addresses.

The aligner may include a clock extraction circuit for extracting clock signals from incoming data signals, said circuit being arranged to direct data signals to the data input of said storage means and to provide timing signals for controlling the writing of data into said storage means.

The storage means may comprise an array of serial in-parallel out shift registers each arranged to store a byte of data. Separate decoders may be associated with said array and arranged to provide read and write addresses for said registers.

The invention will be described now by way of example only with particular reference to the accompanying drawings. In the drawings.

The aligner will be described in the context of a digital telephone exchange where aligners are usually employed at the interface between the incoming digital transmission system and the exchange. The embodiment to be described is concerned with a device which carries out the combined function of an aligner and a time switch.

Figure 1:
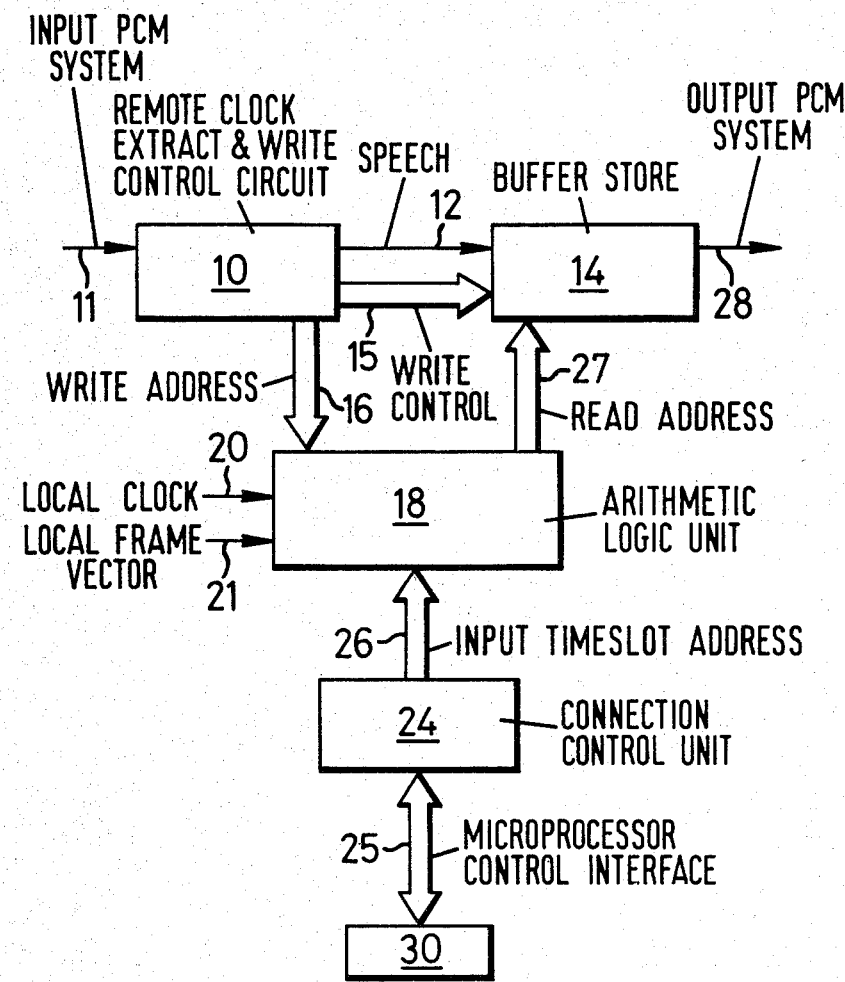
FIG. 1 is a block schematic diagram of a single channel aligner having a time switching capability.

A single channel version of the combined aligner and time switch is shown in FIG. 1 of the drawings. The device comprises a circuit 10 which receives PCM speech samples on a line 11. The circuit 10 has a first output 12 connected to a buffer store 14 and a second output comprising a highway 15 which is also connected to the buffer store 14. A further highway 16 links the circuit 10 to an arithmetic logic unit 18. The arithmetic logic unit 18 receives local clock signals on a line 20 and a local frame vector on a line 21. A connection control unit 24 which is connected by a highway 25 to a microprocessor control unit 30 in the exchange can provide input timeslot address signals to the arithmetic logic unit via highway 26.

The circuit 10 extracts the remote clock and frame vector signals from the incoming PCM samples on line 11 and generates appropriate write control signals which are fed to the buffer store 14 via highway 15. These signals are used to cyclically write into the buffer store 14 all 32 timeslots which are fed to the store 14 via line 12. The write address for each timeslot is fed to the arithmetic logic unit 18 via highway 16.

The reading out of information from the store 14 is controlled from the arithmetic logic unit 18 which provides read addresses on a highway 27. The arithmetic logic unit 18 operates under the control of the local clock and local frame vector and computes the address in the buffer store 14 of the channel which is to be read out on the basis of data received from the connection control unit 24 and the write address on highway 16 and then enables that channel onto the output highway 28. The arithmetic logic unit has to ensure that attempts to simultaneously read and write to the same storage element in the buffer store 14 are avoided. This is achieved in the present arrangement by designing the buffer store 14 so that it is larger than one frame of information such that should a clash be imminent the wanted byte can be taken from an alternative location in the store. This means that slip will have occurred with either the omission of a byte or the repetition of the previous byte. This byte will be read from the same relative location in subsequent frames so that slip does not occur again whilst normal synchronisation is maintained.

Thus, it will be seen that incoming timeslots are read into the buffer store 14 under the control of the remote clock and are read out from that store under the control of the local clock. The arrangement thus provides alignment of the incoming data to the local clock and also carries out a time switching function since a particular byte can be read out onto a selected output channel under the control of the arithmetic logic unit 18.

Figure 2:
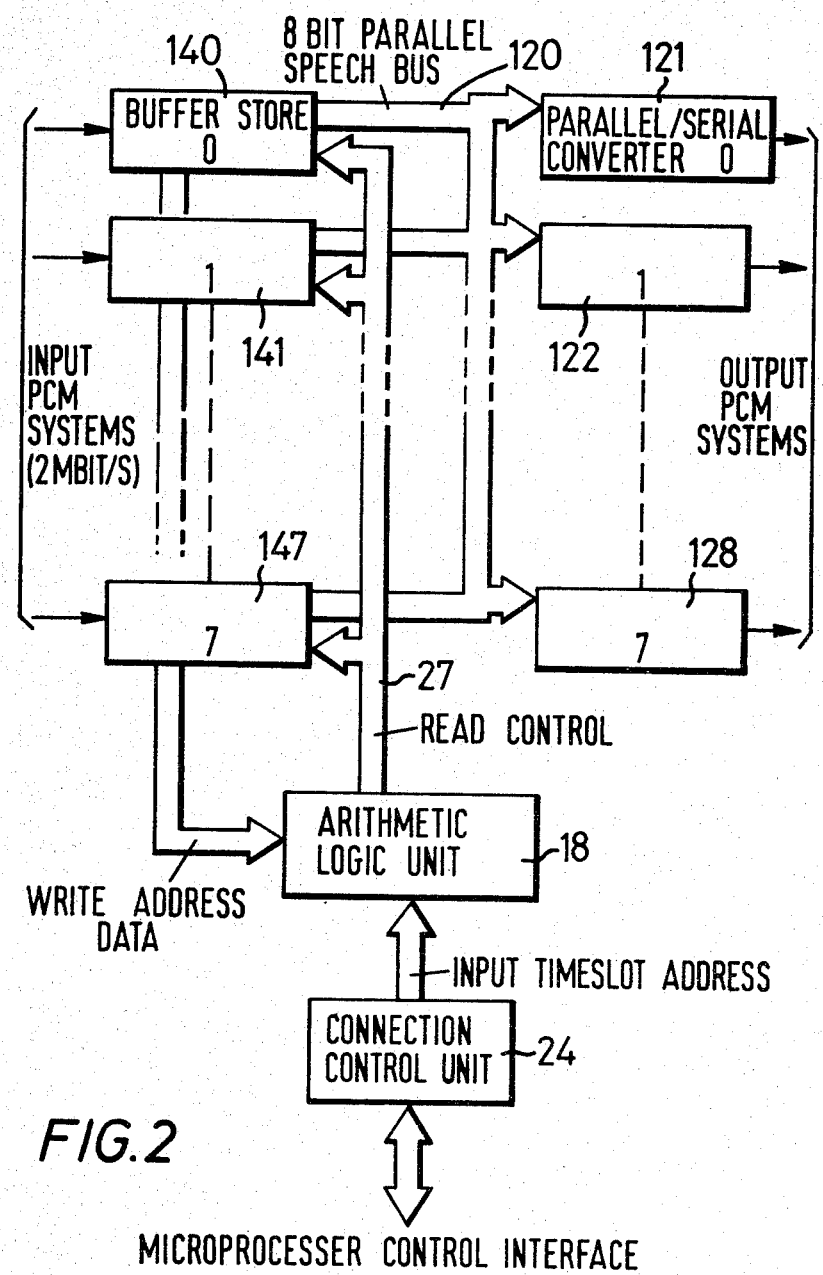
FIG. 2 is a block schematic diagram of an 8×8 aligner with time and space switching between all channels.

The arrangement shown in FIG. 1 is a single channel aligner and time switch. Similar units can be combined to form an 8×8 non-blocking switch by using a common, 8 bit wide, parallel highway containing 256 timeslots operating at 2Mbits/sec. Such an arrangement is shown in FIG. 2 of the drawings. In the arrangement of FIG. 2 eight buffer stores 140 to 147 are provided and each buffer store has an 8 bit parallel speech bus 120 which is connected to parallel to serial converters 121 to 128. The arrangement of FIG. 2 has an arithmetic logic unit 18 which is common to all buffer stores the arithmetic logic unit providing read control signals for the buffer stores onto highway 27. In the aligner and time switch of FIG. 2 the timeslots are ordered such that the parallel to serial output converters 121 to 128 select every eighth byte from the common highway to drive the serial output highways. In order for the arrangement to operate with one common control store and arithmetic logic unit it is necessary that the calculation of the buffer store address can be carried out in 488 n sec (this corresponds to one 2 Mbit/sec period).

It will be appreciated that the size of the buffer store is critical to the operation of the device. The minimum size of the buffer store can be determined by consideration of the aligner function rather than the timeslot interchange function for the following reasons.

1. The aligner has to have the ability to slip a complete frame, i.e. 256 bits or 32 bytes.

2. Under normal operating conditions, i.e. excluding initialisation or loss of national synchronisation, the aligner should be able to accommodate the worst case long and short term variations in phase without introducing slip. For the U.K. telephone network this is usually considered to be 51 bits.

3. It should have the ability to introduce controlled slip by detecting the minimum permissible difference between the read and write clocks. Timing considerations show that four bytes should be allowed for the particular aligner and time switch described here.

As the buffer store has to handle complete channels in order to carry out its time switching function the requirements set out in paragraph 2 above can conveniently be rounded up to seven bytes. The requirements set out in paragraphs 1, 2 and 3 then determine that the buffer store should have a minimum size of 43 bytes. The mean delay through such a store is 21½ bytes or 84 micro seconds.

Figure 3:
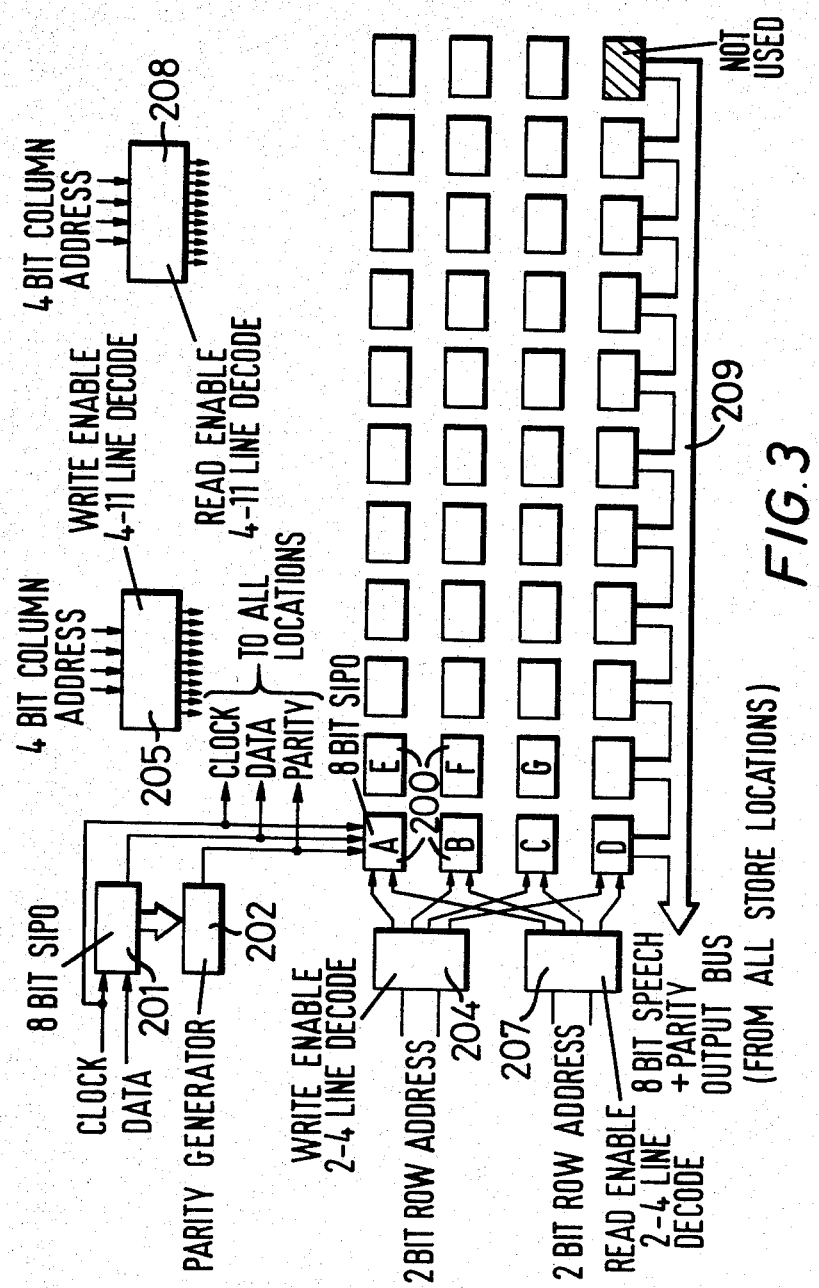
FIG. 3 is a block schematic diagram illustrating a buffer store used in the aligner shown in FIGS. 1 and 2.

An example of a buffer store is illustrated in FIG. 3 of the drawings. The buffer store comprises an array of eight bit serial input/parallel output shift registers 200. The registers 200 are arranged in four rows of eleven columns the shaded shift register not being used as only 43 bytes of storage are required. Clock and data signals are fed to the array of shift registers via an 8 bit serial input parallel output register 201. The register 201 also enables a parity generator 202 so that a parity bit is associated with the clock and data signals fed to the registers.

Writing to the registers 200 is controlled by decoders 204, 205. The decoder 204 receives a two bit row address and decoder 205 receives a four bit column address. The two decoders operate together to provide a co-ordinate address for the particular register to which a byte is to be written.

Similarly reading of the registers is controlled by decoders 207, 208. The decoder 207 receives a two bit row address and the decoder 208 receives a four bit column address. These two decoders together provide a co-ordinate address for the particular shift register which is to be enabled for an eight bit byte to be read out onto output bus 209. As already explained the writing function is carried out under the control of the remote clock whilst the reading function is carried out under the control of the local clock and thus two independent addressing modes are required as shown in FIG. 3.

Two mechanisms ensure that all faults in the buffer store are detectable. Firstly, the use of an odd number of shift registers allows timeslot 0 to exercise every storage location. Timeslot 0 will either contain the frame alignment signal or another pattern if the frame alignment signal has been previously removed. A second fault detection mechanism is provided by the parity bit which is stored with each speech byte and is used to detect what are known as "stuck at" faults on the parallel output from each shift register.

In the operation of the device shown in FIG. 3 the data input line is written cyclically into each shift register element in the array under the control of the write enable co-ordinate address provided by the decoders 204 and 205. The parallel output from each shift register can be enabled under the control of the read enable co-ordinate address provided by the decoders 207 and 208. This read enable co-ordinate address is calculated by the arithmetic logic unit 18 shown in FIGS. 1 and 2 and is arranged to avoid attempts to read and write simultaneously to the same shift register. The following section describes how this is achieved.

In order to understand the operation of the combined aligner and time switch it is necessary to define the following variables for an 8×8 bit unit.

(1) Input channel number (ICN) this is a number in the range 0 to 255 and is an eight bit quantity. The first three bits ICN3 identify one of eight input PCM highways and the other five bits ICN5 identify the particular channel on the highways. Input channels are written cyclically into the registers of the buffer store under the control of the remote clock as already described.

(2) Output channel number (OCN) this is a number in the range 0 to 255. The number identifies an output timeslot on the eight bit parallel speech output highway. The first three bits OCN3 identify the output PCM highway and the other five bits OCN5 identify the particular channel on the highway. The OCN is also the address of a storage location in the connection control unit 24 which contains a ten bit quantity consisting of the ICN, a busy bit and what is known as an F bit which will be defined below. The contents of the connection control store 24 are read cyclically under the control of the local clock. Thus for each OCN the arithmetic logic unit 18 is presented with the particular ICN that is required. The arithmetic logic unit 18 can then calculate the location of the required channel within the buffer store.

(3) Write address (WA)-this is a 6 bit number within the range 0 to 42. It represents the buffer store address currently being written to. The number is derived from a modulo 43 counter which is driven at one eighth of the remote clock rate. The two least significant bits are the row address of the write enable and the other four bits are the column address. Thus, looking at FIG. 3 the registers are written to in the order A B C D E etc.

(4) Read address (RA)-this is a number in the range 0 to 42. It represents the buffer store address which contains the particular channel (ICN5) required by a particular OCN.

(5) Formula bit (F)-this is a single bit stored in the connection control unit 24 for each OCN address. This bit is written by the arithmetic logic unit and is used in a subsequent calculation of the read address for a particular OCN.

(6) Write address of timeslot 0 (WAO)-this is a number in the range 0 to 42 and is the buffer store address to which timeslot 0 was last written.

(7) D=(WA-WAO) modulo 43—this is a convenient quantity which can be generated for each buffer store by a counter that is incremented when WA is incremented and reset when timeslot 0 occurs.

Figure 4:
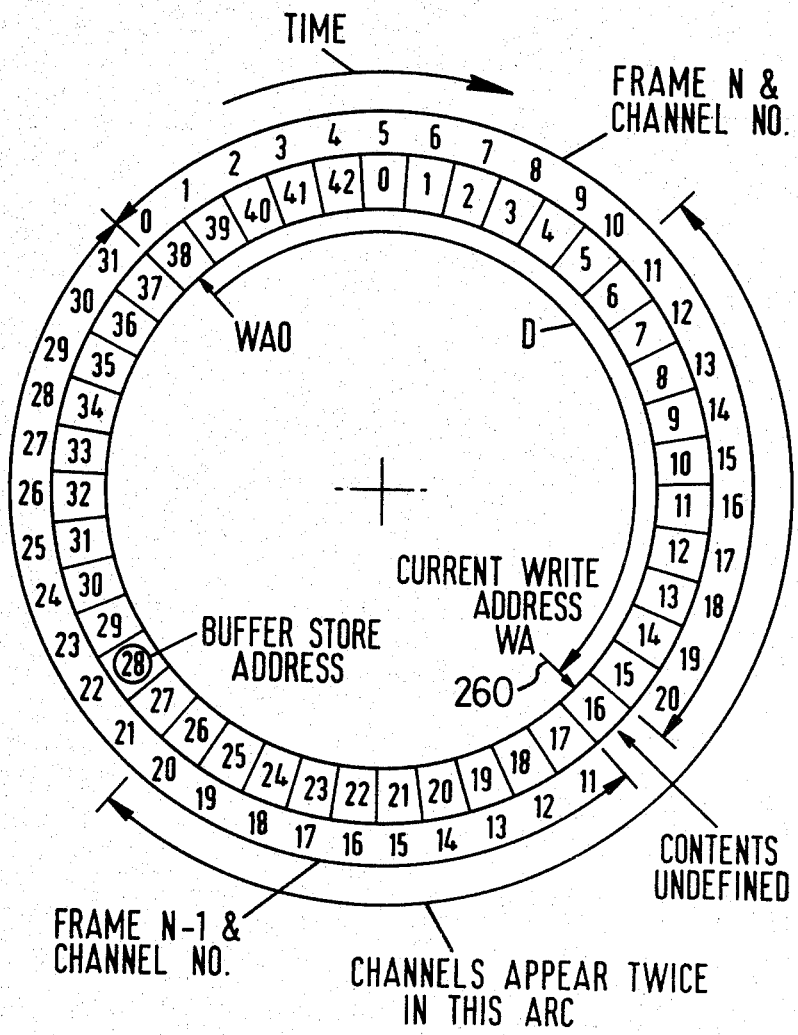
FIG. 4 is a schematic diagram illustrating the operation of the buffer store shown in FIG. 3.

The operation of the buffer store will now be described in more detail with reference to FIG. 4. In FIG. 4 the forty-three 8-bit stores are shown in a circular array of blocks numbered 0 to 42. It will be appreciated that this is a schematic illustration for ease of understanding and does not represent a physical arrangement. Time can be considered as advancing in a clockwise direction when viewed in FIG. 4 and the write address is represented by an arrow 260. The write address moves cyclically in a clockwise direction from one store to the next. Thus, FIG. 4 can be considered as a view of the buffer store showing the contents at a particular time. In this example, the write address is buffer store address 16 which is used to contain channel 10 of frame (N - 1) but is now being over-written by channel 21 of frame N. Timeslot 0 of frame N was written into buffer store address 38. It can be seen that channels 11 to 20 appear twice in the buffer store at the particular time shown. D=(16-38) modulo 43=21.

Two formulae are used to calculate the read address RA at this particular time.

$$RA = WAO + ICN \ (F=0) \text{ for channels 0 to 20 of frame N}$$

$$RA = WAO + ICN + 11 \ (F=1) \text{ for channels 11 to 31 of frame } (N-1).$$

The F bit which is stored in the connection control unit 24 instructs the arithmetic logic unit 18 as to which formula to use. The arithmetic logic unit also calculates a new value of the F bit by comparing RA and WA. To avoid buffer store contention a read operation is not permitted from those stores with addresses $WA-1$, WA, $WA+1$ and $WA+2$.

In FIG. 4 the stores with these addresses are shown shaded the stores being those numbered 15, 16, 17 and 18. These correspond to $D=ICN-1$, ICN, $ICN+1$ and $ICN+2$. The combined aligner and time switch is arranged such that when contention arises, that is to say, when it is required to read from one of the above-mentioned four stores, the size of the store is such that the wanted byte is available from the store having another RA calculated from the alternative formula above. When this occurs the F bit is complemented so that all subsequent read operations avoid store contention. Taking the example shown in FIG. 4, if for example it was required to read from buffer store 18, that is to say timeslot 12 of frame (N−1), this would not be allowed and the arithmetic logic unit would arrange for the reading of timeslot 12 in frame N from the store with address number 7.

A change in the F bit signifies slip that is to say the repetition or omission of a particular byte. The size of the buffer store is such that once slip has occurred for a particular byte, no further slip is encountered whilst normal synchronisation is maintained. This mechanism can be understood from the following considerations. Consider first the situation in which the write address is catching the read address, that is to say, the remote clock is operating faster than the local clock. If formula 1 is being used, i.e. F=0, slip does not occur. On successive frames WA will progressively advance with respect to RA within the limit of 51 bits discussed above. If formula 2 is being used, i.e. F=1, there may come a time when RA=WA+2 and the alternative formula will have to be selected with F being set to 0. RA will then be decreased by 11 corresponding to a change from frame N−1 to frame N.

Consider now the alternative situation of read catching write that is to say the remote clock is operating slower than the local clock. If formula 1 is being used there may come a time when RA=WA−1 and the alternative formula will be used with F then being set to 1. RA will be increased by 11 corresponding to change from frame N to frame N−1. Should subsequently the write begin to catch the read a total phase displacement of 8 bytes would be required before reverting to formula 1. As this is greater than the network design figure of 51 bits it will not happen whilst normal network synchronisation is maintained.

If formula 2 is being used i.e. F=1, slip does not occur.

Figure 5:
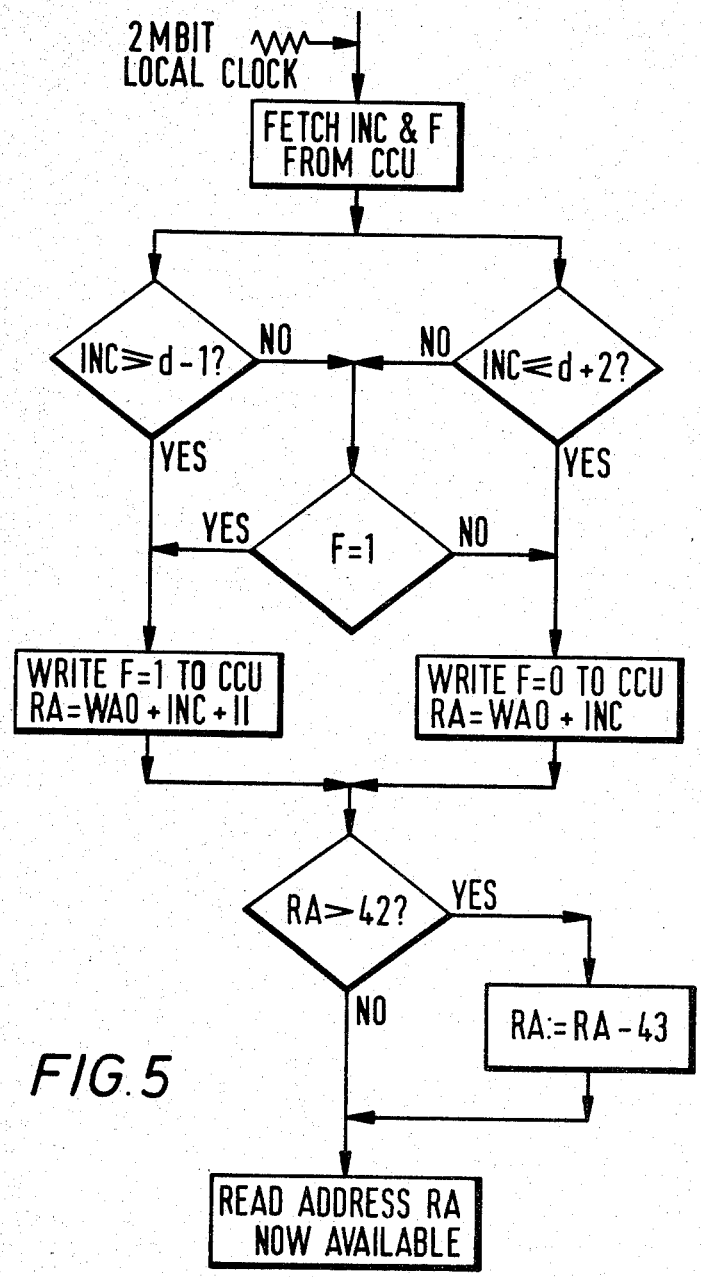
FIG. 5 is a flow chart illustrating the operation of the arithmetic logic unit.

The control algorithm discussed above which controls the reading operation is summarised in the flow chart shown in FIG. 5. For the particular instance shown in FIG. 4 this control algorithm which determines RA does not permit a read from buffer store addresses 15, 16, 17 or 18. Thus only channels 13, 14, 15, 16, 17, 18 and 19 can be obtained from the alternative buffer store address. This is sufficient to meet the requirements which are set out above relating to the maximum phase change in the mesochronous network.

I claim:

1. An aligner with a time switching capability for use in a digital transmission system, said aligner comprising:
   storage means for storing n bytes of data in frames comprising m bytes where n>m,
   the storage means being arranged such that data is written sequentially under the control of timing signals associated with incoming data, and
   means for controlling the reading of data bytes from said storage means to generate outgoing frames of m bytes, including logic means which generates read addresses for the particular bytes to be read at any given read time as determined by other timing signals, said logic means being arranged to detect when a generated read address is in a predetermined relationship with the present write address and, in response to such detection, to instead cause reading of a data byte from the corresponding address of the just-previous or just-subsequent frame of m bytes.

2. An aligner as claimed in claim 1 wherein m is 32 bytes and n is 43.

3. An aligner as claimed in claim 1 wherein the logic means comprises an arithmetic logic unit which receives the write address for each byte written into the storage means, the logic unit operating under the control of a processor and local clock to generate said read addresses.

4. An aligner as claimed in claim 1 including a clock extraction circuit for extracting clock signals from incoming data signals, said circuit being arranged to direct data signals to the data input of said storage means and to provide timing signals for controlling the writing of data into said storage means.

5. An aligner as claimed in claim 1 wherein the storage means comprise an array of serial in-parallel out shift registers each arranged to store a byte of data.

6. An aligner as in claim 5 including
first decoder means connected with each said register for providing write addresses to said array of registers; and
second decoder means connected with each said register for providing read addresses to said array of registers.

7. A digital time re-alignment apparatus for handling incoming digital data of m bytes per frame and re-aligning the timing of such data with locally generated clock signals, said apparatus comprising:
a digital buffer storage means for storing n bytes of digital data in frames of byte storage locations comprising m bytes where n is a number greater than m but less than 2 m;
byte writing control means, connected to said buffer storage means and clocked by remote clock signals extracted from said incoming digital data, for sequentially writing successive incoming data bytes into a corresponding succession of byte storage locations in said buffer storage means at successive times determined by said remote clock signals;
byte reading control means, connected to said buffer storage means and clocked by locally generated clock signals, for reading selected bytes of previously stored data therefrom and including logic means for comparing the byte reading location to the byte writing location and, if these two locations are within a predetermined closeness to one another, then thereafter incrementing or decrementing said byte reading location by a predetermined number n-m so as to controllably "slip" the byte reading address values by one frame and thereby avoid collision between reading and writing processes in the buffer storage means.

8. A digital time re-alignment apparatus as in claim 7 wherein m is 32 bytes and n is 43 bytes.

9. A digital time re-alignment apparatus as in claim 7 wherein said buffer storage means comprises an array of at least n serial in-parallel out shift registers, each of which register stores one byte of digital data.

10. A digital time re-alignment method for handling incoming digital data of m bytes per frame and re-aligning the timing of such data with locally generated clock signals, said method comprising:
storing n bytes of digital data in frames of byte storage locations comprising m bytes where n is a number greater than m but less than 2 m;
sequentially writing successive incoming data byes into a corresponding succession of byte storage locations in a buffer storage means at successive times determined by remote clock signals extracted from said incoming digital data;
reading selected bytes of previously stored data therefrom at times determines by locally generated clock signals; and
comparing the byte reading location to the byte writing location and, if these two locations are within a predetermined closeness to one another, then thereafter incrementing or decrementing said byte reading location by a predetermined number n-m so as to controllably "slip" the byte reading address values by one frame and thereby avoid collision between reading and writing processes in the buffer storage means.

11. A digital time re-alignment method as in claim 10 wherein m is 32 bytes and n is 43 bytes.

12. A digital time re-alignment method as in claim 10 wherein said buffer storage means comprises an array of at least n serial in-parallel out shift registers, each of which register stores one byte of digital data.

* * * * *